(12) United States Patent
Yu Tseng et al.

(10) Patent No.: US 12,265,773 B2
(45) Date of Patent: *Apr. 1, 2025

(54) METHOD AND APPARATUS FOR ELECTROMIGRATION EVALUATION

(71) Applicant: TAIWAN SEMICONDUCTOR MANUFACTURING COMPANY LTD., Hsinchu (TW)

(72) Inventors: Hsien Yu Tseng, Miaoli County (TW); Wei-Ming Chen, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,809

(22) Filed: Apr. 19, 2023

(65) Prior Publication Data

US 2023/0252216 A1    Aug. 10, 2023

Related U.S. Application Data

(63) Continuation of application No. 17/235,790, filed on Apr. 20, 2021, now Pat. No. 11,675,950.

(60) Provisional application No. 63/133,755, filed on Jan. 4, 2021.

(51) Int. Cl.
G06F 30/398 (2020.01)
G06F 30/323 (2020.01)
G06F 30/392 (2020.01)
G06F 119/08 (2020.01)

(52) U.S. Cl.
CPC .......... *G06F 30/392* (2020.01); *G06F 30/323* (2020.01); *G06F 30/398* (2020.01); *G06F 2119/08* (2020.01)

(58) Field of Classification Search
USPC .......................................................... 716/100
See application file for complete search history.

(56) References Cited

U.S. PATENT DOCUMENTS 10,685,166 B1 *    6/2020    Kao ..................... G06F 30/398

* cited by examiner

*Primary Examiner* — Bryce M Aisaka
(74) *Attorney, Agent, or Firm* — WPAT; Anthony King

(57) ABSTRACT

The present disclosure provides a method and an apparatus for testing a semiconductor device. The method includes providing an active area in an integrated circuit design layout; grouping the active area into a first region and a second region; calculating a first self-heating temperature of the first region of the active area; calculating a second self-heating temperature of the second region of the active area; and determining an Electromigration (EM) evaluation based on the first self-heating temperature and the second self-heating temperature.

20 Claims, 12 Drawing Sheets

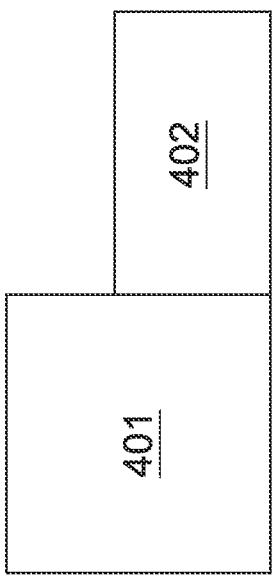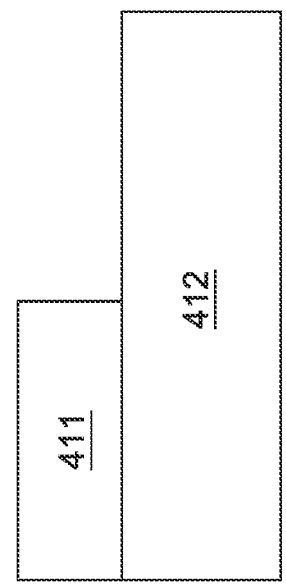

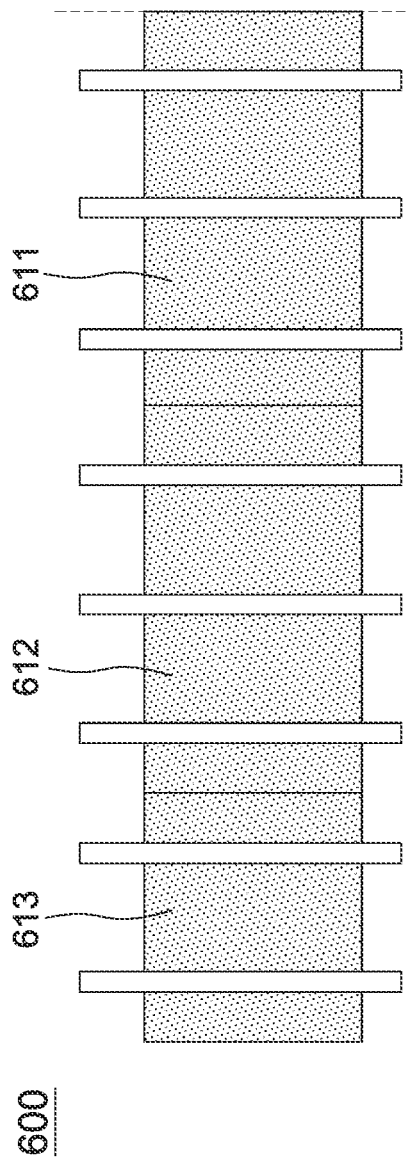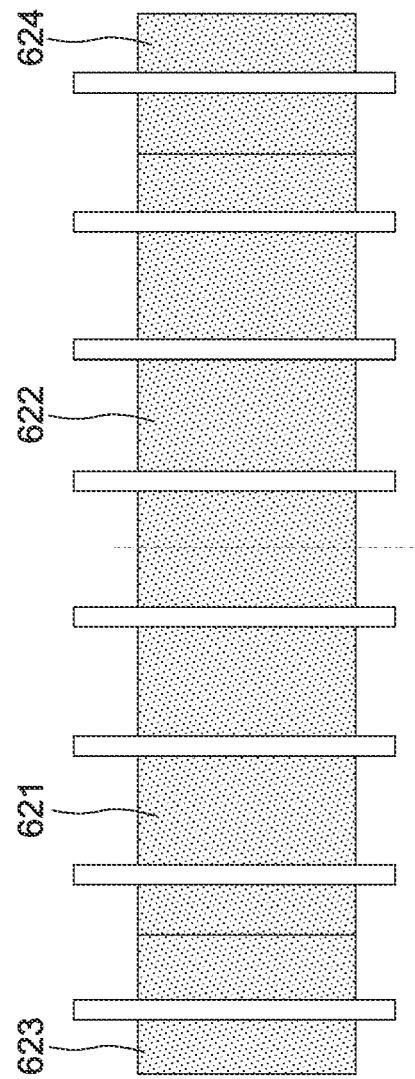

METHOD AND APPARATUS FOR ELECTROMIGRATION EVALUATION

CROSS-REFERENCE

This application is a continuation of prior-filed U.S. application Ser. No. 17/235,790, filed on Apr. 20, 2021, and claims the benefit of previously filed provisional application No. 63/133,755, filed on Jan. 4, 2021, the contents of which are incorporated herein by reference in its entirety.

BACKGROUND

Electromigration (EM) occurs when electrical current runs through a conductive line, wherein the momentum transfer between the conducting electrons and the metal atoms impels metal atoms in the direction of the electron flow, shifting from their original positions and increasing non-uniformity of the conductive line.

Over time, EM generates hillocks (accumulated excess metal) and/or voids (depleted original metal) in the conductive line which may, in turn, result in short circuits (in the presence of hillocks) or open circuits (in the presence of voids).

EM evaluation, analysis, and signoff methodologies applied to a particular integrated circuit design attempt to take at least some of the operative factors into consideration in order to provide a reasonable and prudent estimate regarding the lifetime of semiconductor devices manufactured using the integrated circuit design to avoid premature failure of the semiconductor devices.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features may be arbitrarily increased or reduced for clarity of discussion.

FIGS. 4A-4D show grouped simulated integrated circuit design layouts in accordance with some embodiments of the present disclosure.

FIGS. 6A-6C show grouped simulated integrated circuit design layouts in accordance with some embodiments of the present disclosure.

DETAILED DESCRIPTION

Figure 1:
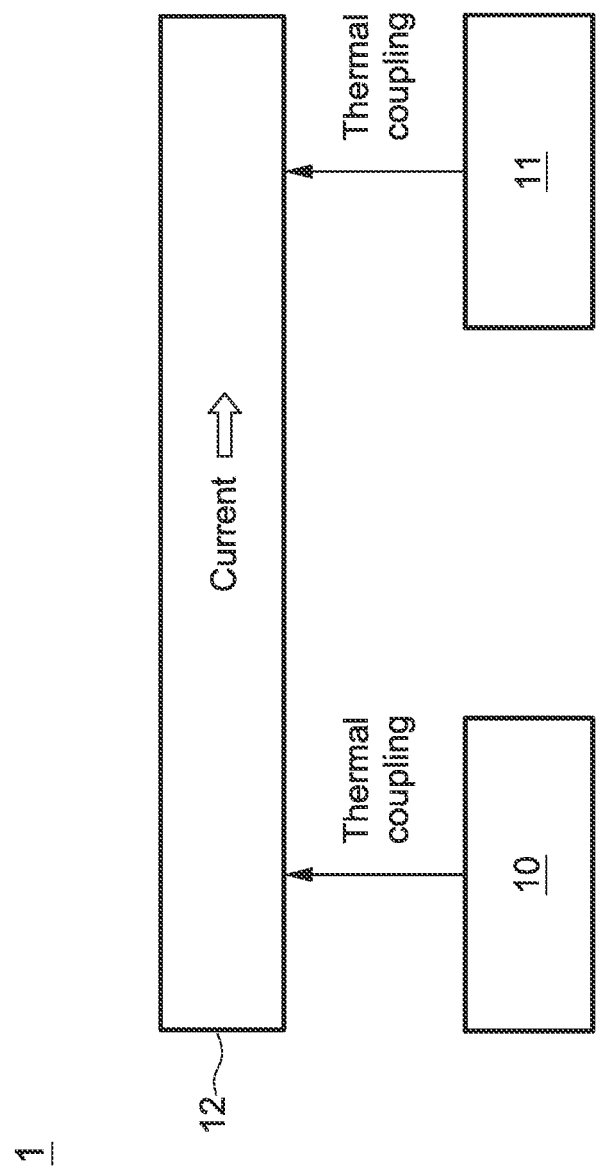
FIG. 1 is a block diagram of a semiconductor device in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device may be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

Semiconductor devices tend to increase in temperature during use as a result of self-heating effects (SHE), limiting both performance capability and operational lifetime of the affected semiconductor devices. For example, self-heating effects in semiconductor devices such as fin field effect transistors (FinFETs) will tend to reduce device performance and reliability.

Accordingly, some FinFET integrated circuit designs utilize the conductive lines and interconnecting vias as heat dissipation conduits for controlling the temperature of the active structures. This technique for dissipating heat, however, increases the operating temperature of the conductive lines. Heat from other active elements, when coupled with inherent current/resistance (IR) heating (also referred to as ohmic or joule heating) of conductive lines, increases the risk of accelerated EM-related failure. Device designers seek to address the risk of increased EM resulting from SHE in the conductive lines to some degree by modifying the integrated circuit design and/or operational parameters, but such design compensations tend to impact density and performance and/or increase the size of the resulting semiconductor device.

FinFET processes and the resulting semiconductor devices tend to provide power, performance, and area benefits over planar semiconductor devices. The FinFET integrated circuit designs; however, tend to exhibit greater local current densities which, in turn, lead to higher probability of EM failure in the conductive lines comprising the signal and power rail interconnections within the FinFET semiconductor devices.

In some instances, a FinFET semiconductor device includes a substrate in which is formed an active region in which a source and drain are formed, a guard ring, a plurality of conductive line layers separated by layers of interlayer dielectric (ILD) material(s), and vias formed through the ILD materials to establish electrical connections to and between the conductive line layers. Depending on the particular integrated circuit design, heat generated within the active regions of the semiconductor device will reach portions of the conductive line layers within the active region impact range and, to some extent, through the vias connecting the conductive lines to the active region.

Because the heat dissipation paths available in FinFET integrated circuit designs are limited by the fin structure, there will be regions and/or structures within the integrated circuit design in which the SHE increases operating temperatures that will accelerate the likelihood of accelerated EM degradation. In some particularly heat sensitive integrated circuit designs, a temperature increase of as little as 10° C. is capable of increasing the EM degradation by 50%. The concerns regarding SHE tend to increase for the reduced structural dimensions associated with more advanced processes and/or high-speed/high-performance integrated circuit designs.

FIG. 1 is a block diagram of a semiconductor device 1 in accordance with some embodiments of the present disclosure. The semiconductor device 1 includes heat generating structures (which may also be referred to as heat sources or hot devices) 10 and 11, and a conductive line segment 12.

Each of the heat generating structures 10 and 11 may be or may include any device or element present on the semiconductor device 1 that may generate heat to the conductive line 12 during the operation of the semiconductor device 1.

In some embodiments, each of the heat generating structures 10 and 11 may be a chip or a die including a semiconductor substrate, one or more integrated circuit devices, and one or more overlying interconnection structures therein. The integrated circuit devices may include active devices such as transistors and/or passive devices such as resistors, capacitors, inductors, or a combination thereof.

In some embodiments, the conductive line segment 12 may include one or more conductive lines including a plurality of metal atoms, selected from a group of metals including, e.g., aluminum (Al), copper (Cu), titanium (Ti), tantalum (Ta), tungsten (W), platinum (Pt), cobalt (Co) and, in some embodiments, one or more alloying metals or other elements including nickel (Ni), nitrogen (N), and silicon (Si). The conductive line segment 12 forms a conductive path for electrons moving between a cathode and an anode.

In some embodiments, the heat generating structure 10 may be or may include a metal-oxide-semiconductor field-effect transistor (MOSFET), such as a complementary MOS (CMOS), a fin field effect transistor (FinFET), an n-channel MOSFET, a p-channel MOSFET, or a combination thereof. In some embodiments, the heat generating structure 11 may be or may include a high-resistance (Hi-R) element. In some embodiments, the Hi-R element may include non-metallic materials.

EM occurs when electrical current runs through a conductive line (such as the conductive line segment 12) and the electrons transfer a portion of their momentum to the metal atoms of the conductive line, thereby impelling the metal atoms in the direction of the electron flow.

Repeated transfers of momentum from the electrons to the metal atoms during operation of a semiconductor device (such as the semiconductor device 1) will gradually shift the metal atoms from their original positions, thereby increasing the non-uniformity of the conductive line.

In those regions of the conductive line in which the movement of the metal atoms reduces the cross-section of the conductive line, the current density will increase and further exacerbate both the self-heating effect and EM in the thinned region(s). Conductive lines incorporating such thinned regions will exhibit increased resistance and will typically lead to reduced performance and, eventually, a void or an open circuit. Conversely, in those regions of the conductive line in which the movement of the metal atoms increases the cross-section of the conductive line, the thickened regions, e.g., hillocks, will tend to stress the surrounding materials and eventually compromise the structural integrity of the surrounding materials and/or create short circuit to an adjacent conductive line or other conductor.

Over time, EM increases the non-uniformity of the conductive line and causes the formation of hillocks (accumulation of excess metal) and/or voids (depletion of initial metal) in the conductive line which may, in turn, tend to result in short circuits (in the presence of hillocks) or open circuits (in the presence of voids).

To avoid EM-related failure of the semiconductor device, EM evaluation, analysis, and signoff methodologies may be applied to estimate a mean time to failure (MTTF) for a conductive line caused by EM. A simulated integrated circuit design that passes the applicable EM requirements may be approved for EM signoff and tape-out for use in manufacturing a semiconductor device.

In some embodiments, an EM evaluation considers various thermal effects, such as self-heating of heat generating structure(s) (which may experience some degree of self-heating during operation) and thermal coupling on heat sensitive structure(s).

For example, the heat generating structures 10 and 11 and the conductive line segment 12 may experience some degree of self-heating during the operation of the semiconductor device 1, and thus may be considered heat generating structures in an EM evaluation. Therefore, the self-heating effects of the heat generating structures 10 and 11 and the conductive line segment 12 may be taken into consideration in an EM evaluation.

In addition, a portion of the heat generated from the heat generating structures 10 and 11 may be transferred to conductive line segment 12 and coupled with inherent current/resistance (IR) heating (also referred to as ohmic or joule heating) of the conductive line segment 12, increasing the risk of EM-related failure. For example, at least a portion of the heat generated from the FinFET semiconductor device may, in turn, be transferred to the conductive lines through direct contact with the transistor and via conduction through intervening materials, e.g., layers of interlayer dielectric (ILD) material(s).

Therefore, an EM evaluation also considers the increased operating temperature of the conductive line segment 12 resulting from or induced by thermal coupling from heat generating structures 10 and 11.

Nevertheless, the self-heating effects EM methodology can encounter some problems when analyzing the large diffusion area design, also known as large active area design. The large diffusion area may depend on process. In some embodiments, the large diffusion area may be micrometer level. In some embodiments, the diffusion area or active area may be a source diffusion area in the semiconductor device. In some embodiments, the diffusion area or active area may be a drain diffusion area in the semiconductor device. For the large diffusion area design, there is no filler between active areas and dummy active areas, such that the self-heating EM analysis result may be too optimistic for some cases. In some embodiments, the self-heating temperature ($\Delta T_{AA}$) is derived from the entire active area. For example, a semiconductor device may include a heat generating structure (also known as hot device) having higher temperature and cold devices having lower temperature. While the self-heating EM analysis is performed on the active area with a relative big area. Therefore, the temperature increase caused by the hot device may be offset by the cold device. That is, the self-heating EM analysis result is underestimated.

To obtain more precise EM analysis result in IC design stage, according to some embodiments of the present disclosure, the simulated integrated circuit design layout, which may be represented by the active area, is grouped into several regions so that the EM analysis result is more reliable. The grouped region contains fewer devices, reducing offset of the hot device. Therefore, the EM analysis performed on the grouped region will be more accurate and better able to reduce the risk of product failure.

In some embodiments, the Technology Computer-Aided Design (TCAD) thermal model can be used to calculate a maximum heat propagation distance. The maximum heat propagation distance can determine the range the heat generating structure impacts. Accordingly, the maximum heat propagation distance can be a factor in determination of how the active area is grouped. The improved EM analysis provides more accurate temperature of the active area in the IC design stage.

Figure 2:
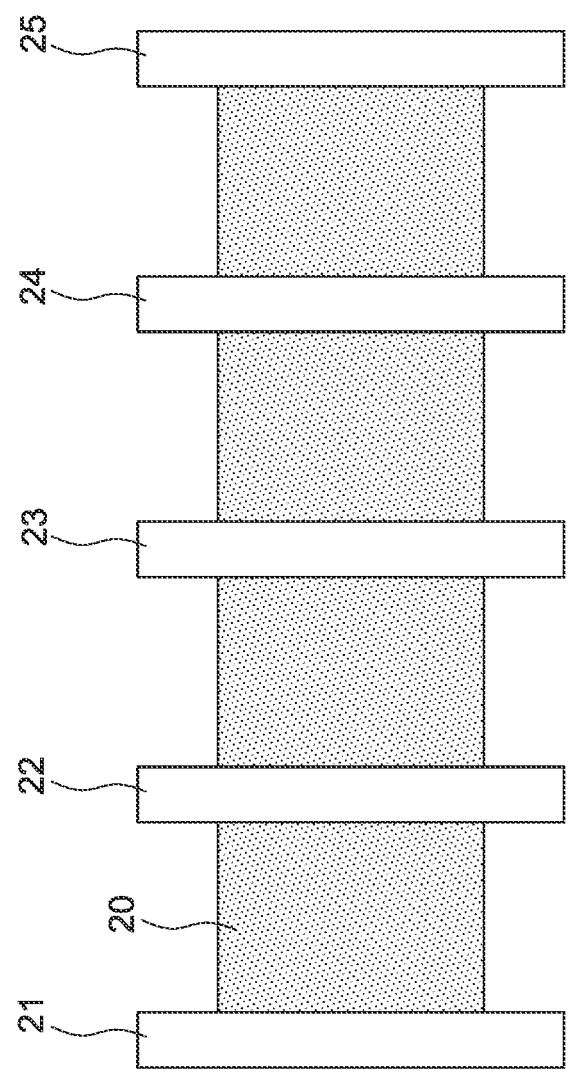
FIG. 2 is a plan view of an active region (AR) in accordance with some embodiments.
Figure 3:
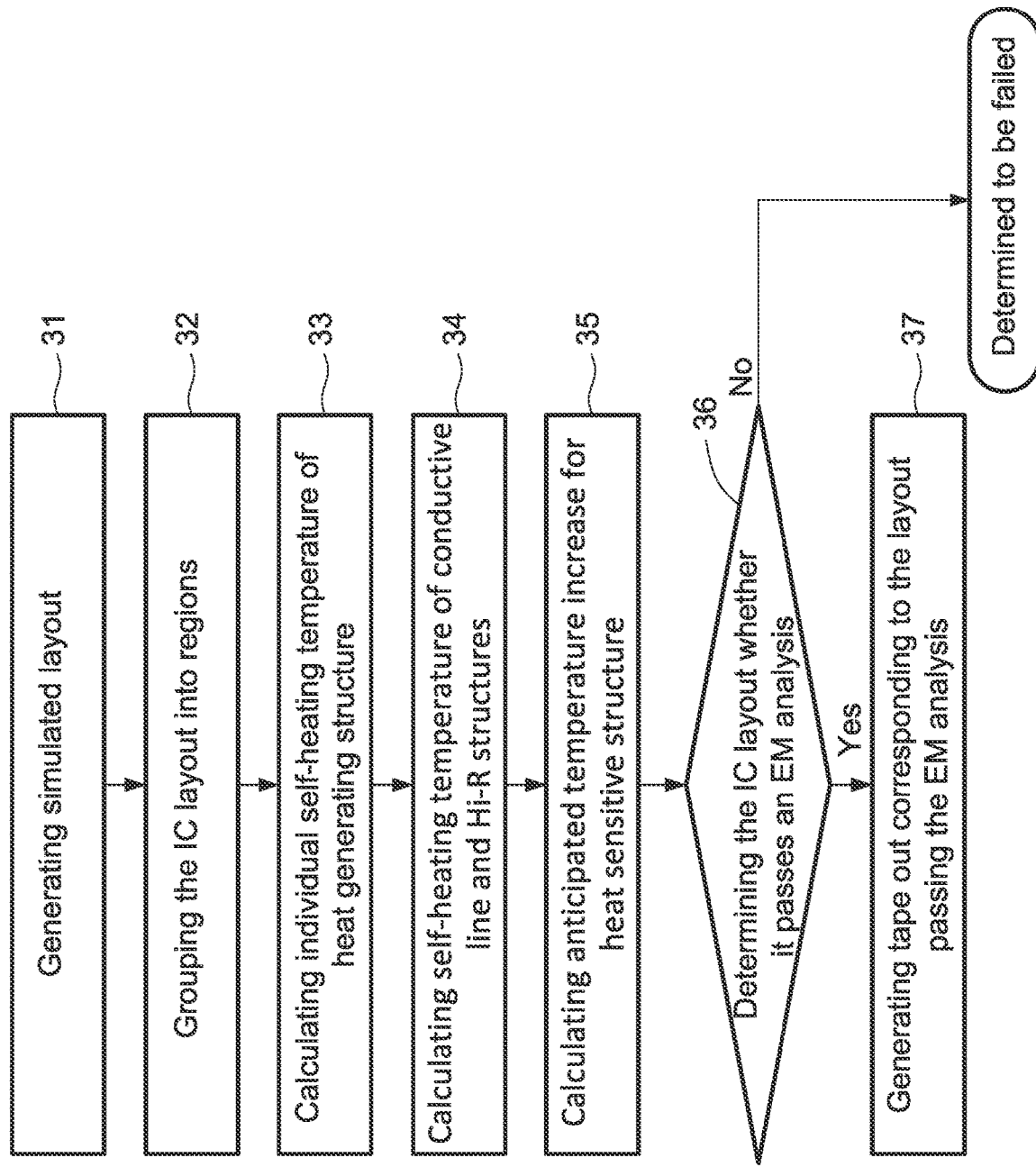
FIG. 3 is a flowchart of an EM evaluation method in accordance with some embodiments of the present disclosure.

FIG. 2 is a simulated integrated circuit design layout 2 in accordance with some embodiments of the present disclosure. FIG. 3 is a flowchart 3 showing an EM evaluation method in accordance with some embodiments of the present disclosure.

In some embodiments, the operations of the EM evaluation method of FIG. 3 may be carried out for the simulated integrated circuit design layout 2 of FIG. 2. However, the present disclosure is not limited thereto. In some embodiments, the EM sign-off methodology of the present disclosure may be applied on any suitable simulated integrated circuit design layout.

The EM evaluation method as shown in FIG. 3 may begin in operation 31, generating a simulated integrated circuit design layout. For example, the simulated integrated circuit design layout 2 as shown in FIG. 2 may be generated by a data storage device for storing design data corresponding to an integrated circuit layout.

In some embodiments, during a structural and/or operational review of a simulated integrated circuit design layout that is under evaluation, one or more temperature sensitive structures and one or more heat generating structures may be identified. For example, structures for which an increased operating temperature will degrade performance and/or lifetime, may be identified as temperature sensitive structures, such as transistors and conductive lines. For example, proximate structures surrounding and/or adjacent to the temperature sensitive structure may be evaluated for identification as heat generating structures.

In order to be identified as a heat generating structure, a proximate structure exhibits at least one of: an operating temperature that meets or exceeds a predetermined temperature level above the anticipated operating temperature of the temperature sensitive structure, and location within the impact area defined by the temperature sensitive structure (or by the heat generating structure) that allows thermal coupling between the heat generating structure and the temperature sensitive structure. Proximate structures having or exhibiting an operating temperature and location sufficient to meet the noted properties are then identified as heat generating structures.

In some embodiments, an electronic design automation (EDA) (also referred to as electronic computer-aided design (ECAD)) tool may be used to identify potential heat generating structures.

The simulated integrated circuit design layout 2 may be a simulated integrated circuit design layout of a FinFET semiconductor device, and may be identified as a heat generating structure. In some embodiments, the simulated integrated circuit design layout 2 may further include a layout for a heat sensitive structure (such as the conductive line segment 12 of FIG. 1, not shown in FIG. 2).

In some embodiments, the simulated integrated circuit design layout 2 as shown in FIG. 2 includes an active area or oxide defined (OD) area 20, polysilicon gates (PO) 22, 23, 24, and polysilicon gates over diffusion edge (PODE) 21, 25. In some embodiments, there may be any number of active areas, PO, and PODE in the simulated integrated circuit design layout 2 based on design requirements.

By recognizing and determining the practical current distribution of heat generating structures, the EM evaluation according to some embodiments of the present disclosure provides a more grounded and accurate estimate of the anticipated performance of the semiconductor device, thereby increasing the likelihood that semiconductor devices can meet or exceed customer expectations.

In operation 32, the active area 20 of the simulated integrated circuit design layout 2 is grouped or categorized into at least two regions in accordance with some embodiments of the present disclosure. According to FIG. 2, the active area 20 of the simulated integrated circuit design layout 2 can be referred as a grouped region. Each of the grouped regions comprises at least one polysilicon gate disposed on the region. In order to improve the accuracy of the EM analysis, the active area 20 can be grouped into different regions based on shapes, widths, heights, distances, or any other parameters or criteria as shown in FIGS. 4A-4D, 5A-5C, 6A-6C, and 7A-7B (which illustrate different methods to group an active area in accordance with some embodiments of the present disclosure).

In operation 33, an individual self-heating temperature $\Delta T_{AA}$ of each grouped region 20 of the simulated integrated circuit design layout 2 can be calculated. In some embodiments, calculating the $\Delta T_{AA}$ for the grouped region 20 is a function of the individual self-heating temperature calculations for each of the structures (such as PO 22, 23, and 24, and PODE 21, 25) incorporated within the grouped region 20. In some embodiments, the function can be expressed by Eq. 1:

$$\Delta T_{AA} = f(\Delta T_{PODE1}, \Delta T_{PO1}, \Delta T_{PO2}, \Delta T_{PO3}, \Delta T_{PODE2}) \quad [\text{Eq. 1}],$$

in which $\Delta T_{PODE1}$ represents an individual self-heating temperature of PODE 21; $\Delta T_{PO1}$ represents an individual self-heating temperature of PO 22; $\Delta T_{PO2}$ represents an individual self-heating temperature of PO 23; $\Delta T_{PO3}$ represents an individual self-heating temperature of PO 24; and $\Delta T_{PODE2}$ represents an individual self-heating temperature of PODE 25.

In some embodiments, this self-heating temperature $\Delta T_{AA}$ of the grouped region 20 may then be used in subsequent calculations for evaluating the magnitude of thermal coupling between the active area 20 and heat sensitive structures proximate to the simulated integrated circuit design layout 2, e.g., conductive lines.

In some embodiments, the device temperature formula Eq. 1 may be provided as part of the design tool set provided by a semiconductor device foundry including, for example, a Simulation Program with Integrated Circuit Emphasis (SPICE) model corresponding to a particular manufacturing process.

In operation 34, an anticipated self-heating temperature $\Delta T_{rms}$ of conductive lines (not shown in FIG. 2) and an anticipated self-heating temperature $\Delta T_{Hi-R}$ of Hi-R structures (not shown in FIG. 2) identified in the integrated circuit design layout 2 can be calculated based on the data from the data storage device storing design data corresponding to the integrated circuit layout. Based on the anticipated self-heating temperature of the heat sensitive structures and proximate heat generating structures, an anticipated temperature increase for the temperature sensitive structures, e.g., conductive lines, may be calculated during operation of a semiconductor device according to the integrated design circuit layout 2.

In operation 35, an anticipated temperature increase $\Delta T_{Con}$ for a heat sensitive structure proximate to the simulated integrated circuit design layout 2 may be calculated.

In some embodiments, the anticipated temperature increase $\Delta T_{Con}$ for a heat sensitive structure, e.g., a conductive line, may be a function of both self-heating of the heat sensitive structure and the thermal contribution(s) (or thermal coupling(s)) from other heat generating structures proximate to the heat sensitive structure. In some embodiments, the anticipated temperature increase $\Delta T_{Con}$ for a heat sensitive structure may be calculated according to the formula Eq. 2:

$$\Delta T_{Con} = \Delta T_{rms} + f(a, b, \Delta T_{AA}, c, d, \Delta T_{Hi-R}, \Delta T_{other\_devices}) \quad [\text{Eq. 2}],$$

in which $\Delta T_{rms}$ represents a current-induced metal heating temperature of a heat sensitive structure; $\Delta T_{AA}$ represents a self-heating temperature of the grouped region of the active area of the semiconductor device; $\Delta T_{Hi-R}$ represents a self-heating temperature of a Hi-R device; $\Delta T_{other\_devices}$ represents a self-heating temperature from other devices; thermal coefficient a represents a derating coefficient (or de-rating coefficient) value reflecting operation at less than maximum capacity; thermal coefficient b represents a function of $\Delta T_{rms}$ and $\Delta T_{AA}$ [f($\Delta T_{rms}, \Delta T_{AA}$)]; thermal coefficient c represents a layer effect associated with the layer/material; and thermal coefficient d represents a temperature profile associated with the layer/material.

For the purposes of the anticipated temperature increase $\Delta T_{Con}$ calculation according to formula Eq. 2, other devices can include, for example, bipolar junction transistors (BJT), diodes, and resistors thermally coupled to the heat sensitive structure under analysis.

In some embodiments, the thermal coefficients, a, b, c, and d may be specific to each of the materials and/or layers incorporated in the simulated integrated circuit design layout and to the particular manufacturing process used to produce semiconductor devices according to the simulated integrated circuit design layout.

In some embodiments, adjustment of the anticipated temperature increase $\Delta T_{Con}$ for the heat sensitive structure by the thermal contribution(s) may provide a more accurate analysis of the anticipated performance of the semiconductor device. In some embodiments, the range over which thermal coupling is expected to occur between a heat generating structure and the heat sensitive structure (which may also be referred to as the impact range or thermal coupling range), is defined by a horizontal distance from the associated heat generating structure. For example, the formula Eq. 2 may include the thermal contribution(s) based on the location of the heat sensitive structure with respect to the heat generating structure (such as the Hi-R impact area and the active region impact area). For example, the formula Eq. 2 may include the thermal contribution(s) from the impact areas associated with two or more heat generating structures overlapping at least in part (i.e., a combined impact area).

In operation 36, the IC layout is determined whether it passes an EM analysis.

In some embodiments, the anticipated temperature increase $\Delta T_{Con}$ may be used to evaluate the heat sensitive structure at an evaluation temperature TE. The EM analysis is then evaluated according to the evaluation temperature TE. In some embodiments, the EM analysis is evaluated by comparing the evaluation temperature TE of the heat sensitive structure with a predetermined threshold temperature. If the evaluation temperature TE is higher than the predetermined threshold temperature, the EM analysis for the integrated circuit design layout is considered failure. If the evaluation temperature TE is lower than the predetermined threshold temperature, it is determined that the integrated circuit design layout passes the EM analysis. In some embodiments, the predetermined threshold temperature may be based on the data from the data storage device storing design data corresponding to the integrated circuit layout.

In operation 37, a tape out data file corresponding to an integrated circuit layout that passes the EM analysis may be generated.

In some embodiments, the EM methodologies detailed can be applied to any integrated circuit design layout and/or semiconductor manufacturing process in which self-heating effects are anticipated. In some embodiments, the integrated circuit design layouts can include FinFET devices and/or other planar or more complex structural semiconductor manufacturing processes.

In some embodiments, the self-heating detection EM evaluation identifies regions, if any, of the integrated circuit design layout in which the self-heating effects result in localized heating, e.g., a "hotspot," that will reduce overall EM performance and/or lifetime of semiconductor devices manufactured according to the integrated circuit design. In some embodiments, the initial self-heating aware EM evaluation is coupled with a heat sink-aware EM evaluation in order to determine if one or more surrounding structures are capable of mitigating the self-heating effects and/or thermal coupling effects previously identified and thereby improving the EM performance of the integrated circuit design layout.

In some embodiments, the device temperature equation is provided as a design tool provided by a semiconductor device foundry corresponding to a particular manufacturing process.

FIGS. 4A and 4B show an integrated circuit design layout in accordance with some embodiments of the present disclosure. In some embodiments, the integrated circuit design layout illustrated in FIGS. 4A and 4B may be or include an active area 400. For clarity, some elements (such as polysilicon gates shown in FIG. 2) are omitted. As shown in FIGS. 4A and 4B, the active area 400 may include an L-shape. For example, the active area 400 may include a portion (e.g., the portion on the left-hand side of FIG. 4A or 4B) having a height larger than a height of another portion (e.g., the portion on the right-hand side of FIG. 4A or 4B).

As shown in FIG. 4A, the active area 400 can be grouped into two regions 401 and 402 in accordance with different heights of the active area 400. The height of the region 401 is different from the height of the region 402. The height of the region 401 is larger than the height of the region 402. The width of the region 401 and the region 402 are not limited. For example, the width of the region 401 may be larger, equal to or less than the width of the region 402. In some embodiments, an interface between the region 401 and the region 402 may extend along the polysilicon gates, vertically.

As shown in FIG. 4B, the active area 400 can be grouped into two regions 411 and 412 in accordance with different widths of the active area 400. The width of the region 411 is different from the width of the region 412. The width of the region 411 may be narrower than the width of the region 412. The height of the region 411 and the region 412 are not limited. For example, the height of the region 411 may be larger, equal to or less than the height of the region 412. In some embodiments, an interface between the region 411 and the region 412 may extend along the polysilicon gates, horizontally.

Figure 4C:
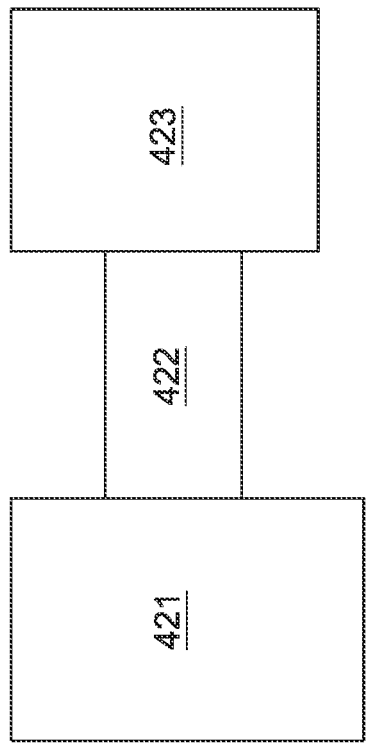
Figure 4D:
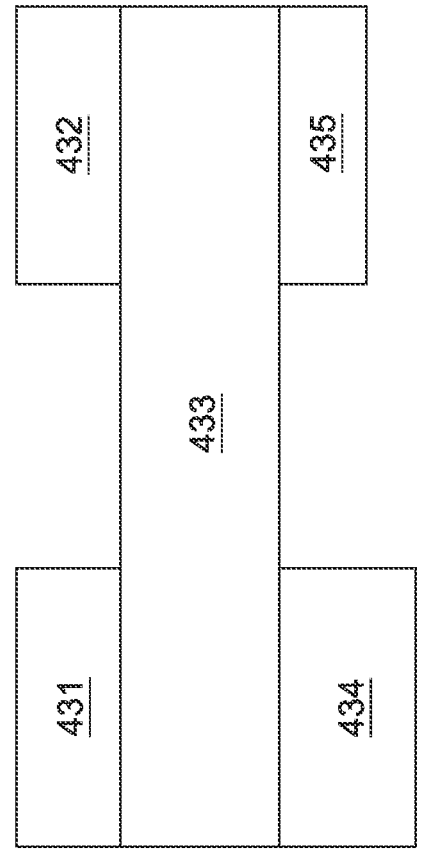

FIGS. 4C and 4D show an integrated circuit design layout in accordance with some embodiments of the present disclosure. In some embodiments, the integrated circuit design layout illustrated in FIGS. 4C and 4D may be or include an active area 420. For clarity, some elements (such as polysilicon gates shown in FIG. 2) are omitted. As shown in FIGS. 4C and 4D, the active area 420 may include an H-shape. For example, the active area 420 may include a portion (e.g., the portion on the middle of FIG. 4C or 4D) having a height less than a height of another portions adjacent to the portion (e.g., the portion on the left-hand side and the right-hand side of FIG. 4C or 4D).

As shown in FIG. 4C, the active area 420 can be grouped into three regions 421, 422, and 423 in accordance with different heights of the active area 420. The height of the region 421 differs from that of the region 422, adjacent thereto. The height of the region 421 is larger than the height of the region 422. The heights of the region 422 and the region 423 are different from each other. The height of the region 422 is smaller than the height of the region 423. The heights of the region 421 and the region 423 are different from each other. The height of the region 421 may be larger than the height of the region 423. The width of the regions 421, 422, and 423 are not limited. For example, the region 421, 422, and 423 may include the same width or different widths. In some embodiments, an interface between the regions 421 and 422 and an interface between the regions 422 and 423 may extend along the polysilicon gates, vertically.

As shown in FIG. 4D, the active area 420 can be grouped into five regions 431, 432, 433, 434, and 435 in accordance with different widths of the active area 420. The widths of the adjacent regions are different. For example, the width of the region 431 may be different from the width of the region 433. The width of the region 432 may be different from the width of the region 433. The width of the region 431 may be the same as the width of the region 434. The width of the region 432 may be the same as the width of the region 435. The height of the regions 431, 432, 433, 434, and 435 are not limited. For example, the regions 431, 432, 433, 434, and 435 may include the same height or different heights. In some embodiments, an interface between the regions 431 and 433, an interface between the regions 432 and 433, an interface between the regions 434 and 433, and an interface between the regions 435 and 433 may extend along the polysilicon gates, horizontally.

Figure 5A:
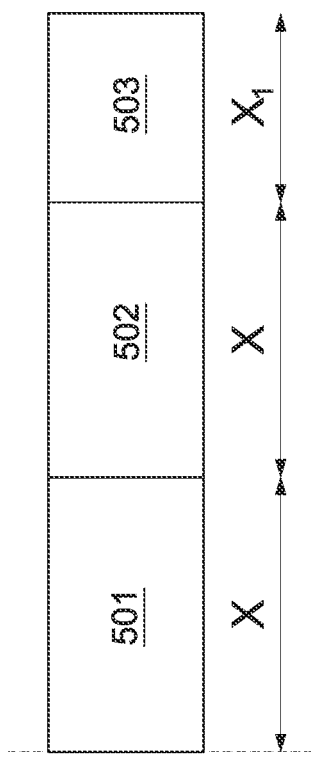
FIGS. 5A-5C show grouped simulated integrated circuit design layouts in accordance with some embodiments of the present disclosure.
Figure 5B:
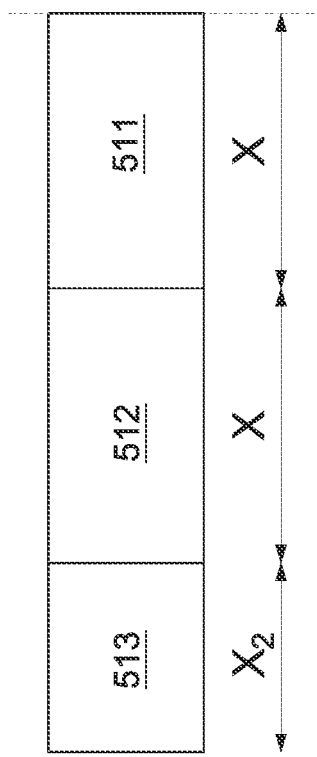
Figure 5C:
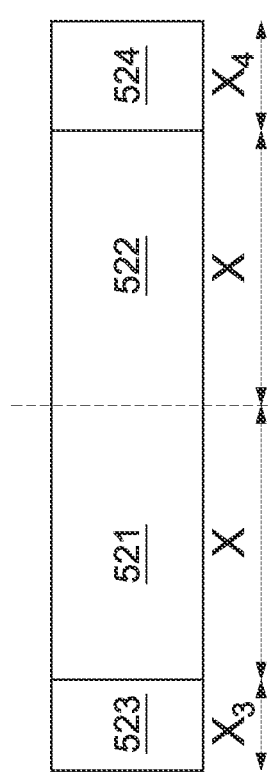

FIGS. 5A, 5B, and 5C show an integrated circuit design layout in accordance with some embodiments of the present disclosure. In some embodiments, the integrated circuit design layout illustrated in FIGS. 5A, 5B, and 5C may be or include an active area 500. For clarity, some elements (such as polysilicon gates shown in FIG. 2) are omitted. As shown in FIGS. 5A, 5B, and 5C, the active area 500 may include a rectangular shape.

As shown in FIG. 5A, the active area 500 can be grouped into three regions 501, 502, and 503 based on a constant distance from the left side. All the regions of the active area 500 except the right-most region may include the same width. For example, the regions 501 and 502 include the width of X. The right-most region 503 has a width of X1, where X1 is equal to or less than X. The height of the regions 501, 502, and 503 are not limited. For example, the regions 501, 502, and 503 may include the same height or different heights. In some embodiments, an interface between the adjacent regions (such as the regions 501 and 502, and the regions 502 and 503) may extend along the polysilicon gates, vertically.

As shown in FIG. 5B, the active area 500 can be grouped into three regions 511, 512, and 513 based on a constant distance from the right side. All the regions of the active area 500 except the left-most region may include the same width. For example, the regions 511 and 512 include the width of X. The left-most region 513 has a width of X2, where X2 is equal to or less than X. The height of the regions 511, 512, and 513 are not limited. For example, the regions 511, 512, and 513 may include the same height or different heights. In some embodiments, an interface between the adjacent regions (such as the regions 511 and 512, and the regions 512 and 513) may extend along the polysilicon gates, vertically.

As shown in FIG. 5C, the active area 500 can be grouped into four regions 521, 522, 523, and 524, based on a constant distance from the middle of the active area. All the regions of the active area 500 except the right-most region and the left-most region may include the same width. For example, the regions 521 and 522 include the width of X. The left-most region 523 has a width of X3, where X3 is equal to or less than X. The right-most region 524 has a width of X4, where X4 is equal to or less than X. The height of the regions 521, 522, 523, and 524 are not limited. For example, the regions 521, 522, 523, and 524 may include the same height or different heights. In some embodiments, an interface between the regions 521 and 522, an interface between the regions 521 and 523, and an interface between the regions 522 and 524 may extend along the polysilicon gates, vertically.

Figure 6A:
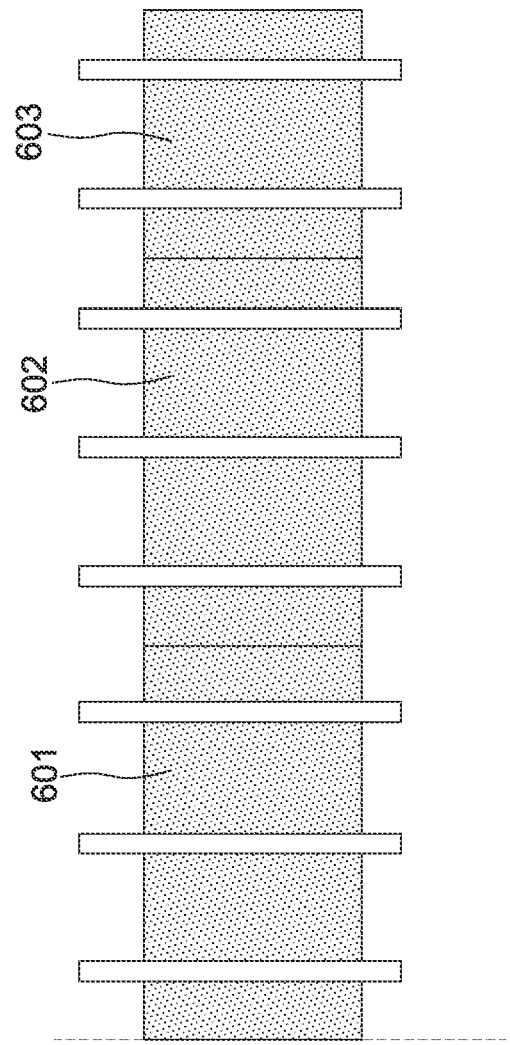

FIGS. 6A, 6B, and 6C show an integrated circuit design layout in accordance with some embodiments of the present disclosure. In some embodiments, the integrated circuit design layout illustrated in FIGS. 6A, 6B, and 6C may be or include an active area 600 and polysilicon gates disposed on the active area 600. For clarity, some elements are omitted. As shown in FIGS. 6A, 6B, and 6C, the active area 600 may include a rectangular shape.

As shown in FIG. 6A, the active area 600 can be grouped into three regions 601, 602, and 603 based on the number of polysilicon gates from the left side. All the regions of the active area 600 except the right-most region may include the same number of polysilicon gates. For example, the regions 601 and 602 include the same number of polysilicon gates. The right-most region 603 may have polysilicon gates equal to or less than other regions. In some embodiments, the regions 601 and 602 have three polysilicon gates, and the region 603 has two polysilicon gates. The number of the polysilicon gates included in a region can be changed depending on design requirements. In some embodiments, an interface between the regions 601 and 602, and an interface between the regions 602 and 603 may extend along the polysilicon gates, vertically.

As shown in FIG. 6B, the active area 600 can be grouped into three regions 611, 612, and 613 based on the number of polysilicon gates from the right side. All the regions of the active area 600 except the left-most region may include the same number of polysilicon gates. For example, the regions 611 and 612 include the same number of polysilicon gates. The left-most region 613 may have polysilicon gates equal to or less than other regions. In some embodiments, the regions 611 and 612 have three polysilicon gates, and the region 613 has two polysilicon gates. The number of the polysilicon gates included in a region can be changed depending on design requirements. In some embodiments, an interface between the regions 611 and 612, and an interface between the regions 612 and 613 may extend along the polysilicon gates, vertically.

As shown in FIG. 6C, the active area 600 can be grouped into four regions 621, 622, 623, and 624 based on the number of polysilicon gates from the middle of the active area 600. All the regions of the active area 600 except the right-most region and the left-most region may include the same number of polysilicon gates. For example, the regions 621 and 622 include the same number of polysilicon gates. The left-most region 623 and the right-most region 624 may have polysilicon gates equal to or less than other regions. In some embodiments, the regions 621 and 622 have three polysilicon gates, and the regions 623 and 624 have one polysilicon gate. The number of the polysilicon gates included in a region can be changed depending on design requirements. In some embodiments, an interface between the regions 621 and 622, an interface between the regions 621 and 623, and an interface between the regions 622 and 624 may extend along the polysilicon gates, vertically.

Figure 7A:
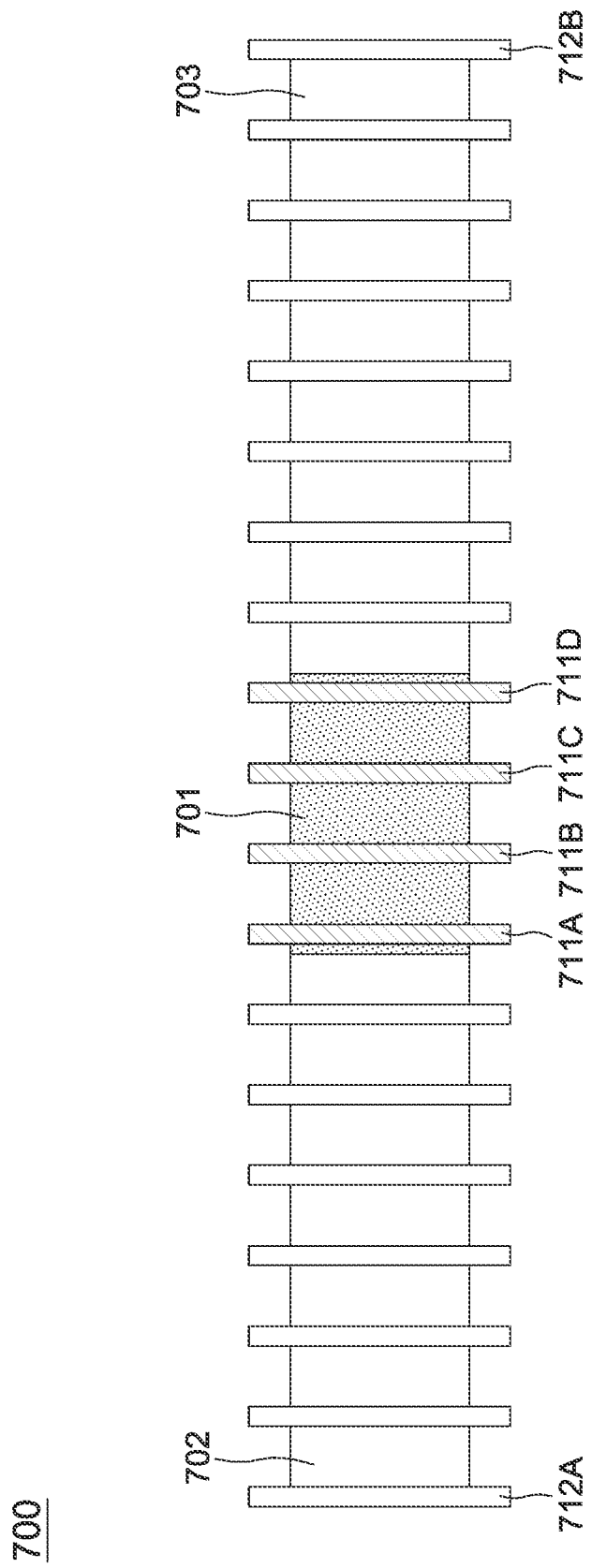
FIGS. 7A-7B show grouped simulated integrated circuit design layouts in accordance with some embodiments of the present disclosure.
Figure 7B:
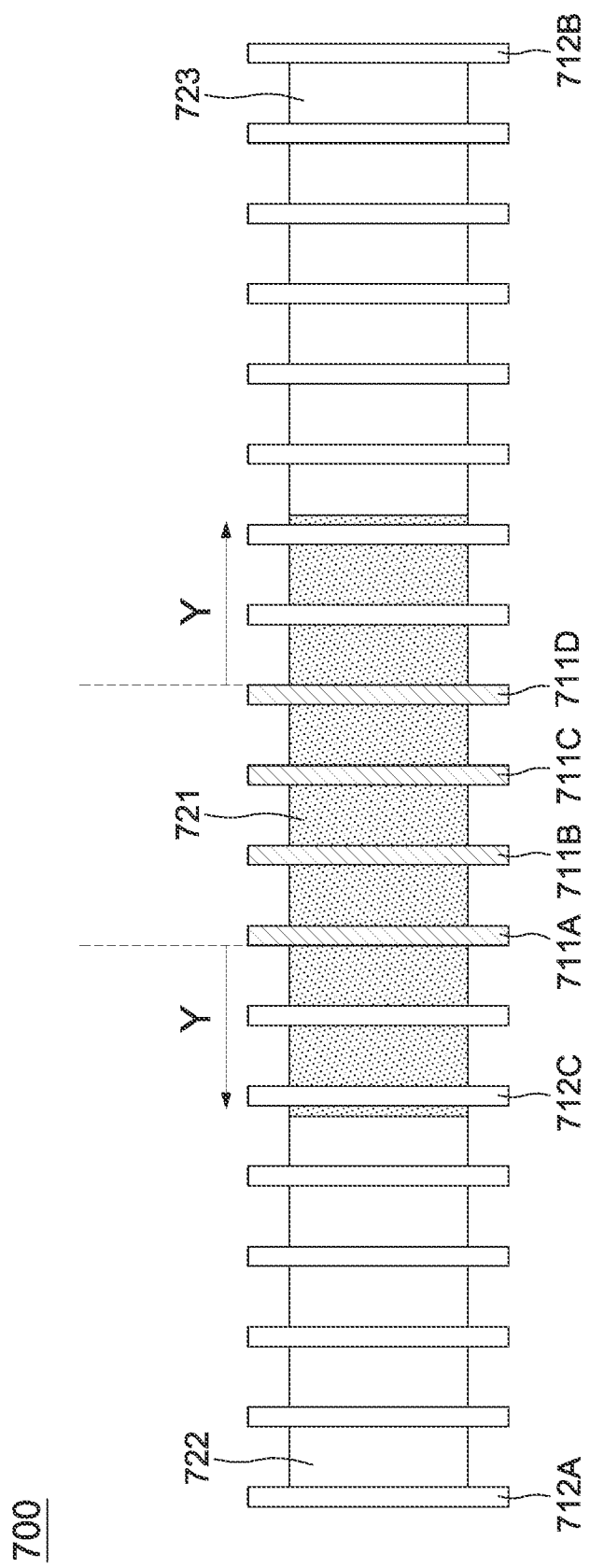

FIGS. 7A and 7B show an integrated circuit design layout in accordance with some embodiments of the present disclosure. In some embodiments, the integrated circuit design layout illustrated in FIGS. 7A and 7B may include an active area 700, polysilicon gates 711A, 711B, 711C, and 711D disposed on the active area 700, and polysilicon gates 712A and 712B (and 712C) disposed on the active area 700. For clarity, some elements are omitted. As shown in FIGS. 7A and 7B, the active area 700 may include a rectangular shape.

As shown in FIG. 7A, the active area 700 can be grouped into three regions 701, 702, and 703 based on the location of a heating source (which may be heat generating structure) or adjacent to a heating source. For example, the region 701 of the active area 700 including the polysilicon gates 711A, 711B, 711C, and 711D may include a temperature higher than a temperature of other regions of the active area 700. The regions 702 and 703 may include one or more polysilicon gates. For example, the region 702 may include seven polysilicon gates 712A, and the region 703 may include eight polysilicon gates 712B. In some embodiments, the polysilicon gates 711A, 711B, 711C, and 711D within the region 701 has an operating temperature higher than an operating temperature of the polysilicon gates 712A and 712B outside the region 701. In some embodiments, the operating temperature of the polysilicon gates 711A, 711B, 711C, and 711D may exceed a predetermined temperature, while the operating temperature of the polysilicon gates 712A and 712B may be lower than the predetermined temperature. In some embodiments, an interface between the adjacent regions 701 and 702, and an interface between the adjacent regions 701 and 703 may extend along the polysilicon gates, vertically.

As shown in FIG. 7B, the active area 700 can be grouped into three regions 721, 722, and 723 based on the location of a heating source (which may be heat generating structure) or adjacent to a heating source. For example, the region 721 of the active area 700 including the polysilicon gates 711A, 711B, 711C, and 711D and the polysilicon gates 712C may include a temperature higher than a temperature of other regions of the active area 700. In some embodiments, the boundary of the region 721 may be determined by a predetermined impact range Y extending horizontally from the polysilicon gates 711A and 711D. The regions 722 and 723 may include one or more polysilicon gates outside the region 721. For example, the region 722 may include five polysilicon gates 712A, and the region 723 may include six polysilicon gates 712B. In some embodiments, the polysilicon gates 711A, 711B, 711C, and 711D within the region 711 has an operating temperature higher than an operating temperature of the polysilicon gates 712A, 712B, and 712C. In some embodiments, the operating temperature of the polysilicon gates 711A, 711B, 711C, and 711D may exceed a predetermined temperature, while the operating temperature of the polysilicon gates 712A, 712B, and 712C may be lower than the predetermined temperature. In some embodiments, an interface between the adjacent regions 721 and 722, and an interface between the adjacent regions 721 and 723 may extend along the polysilicon gates, vertically.

Figure 8:
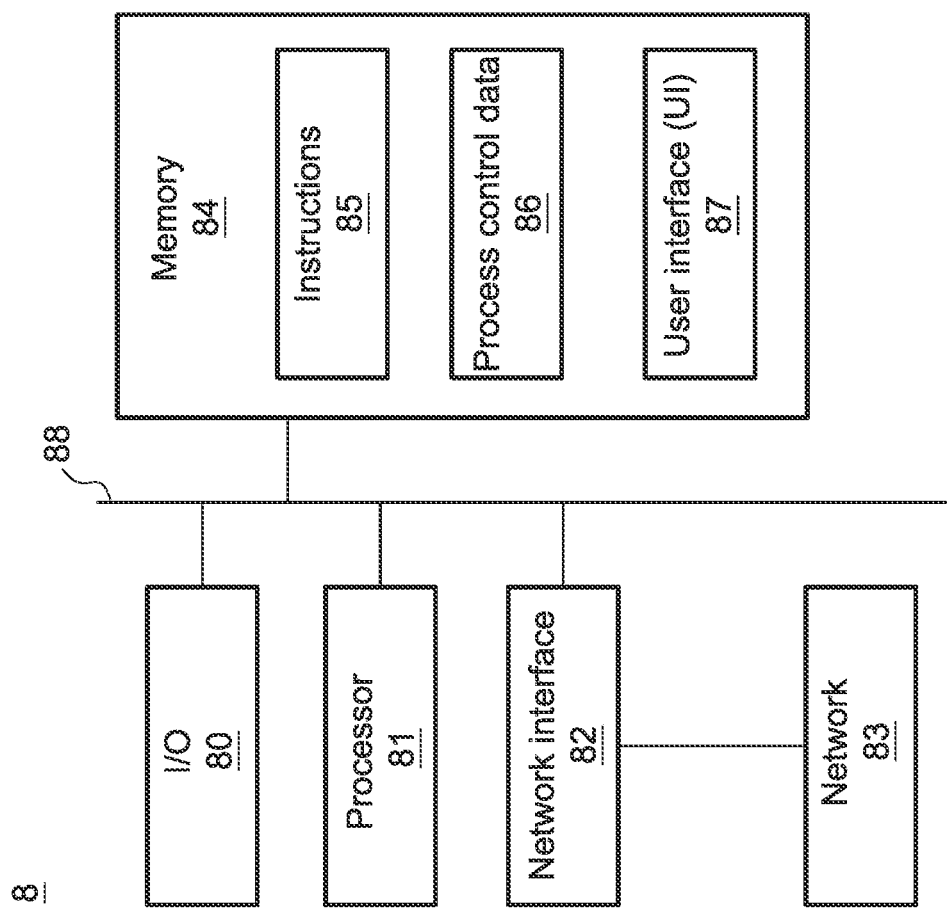
FIG. 8 is a block diagram of an electronic process control (EPC) system in accordance with some embodiments of the present disclosure.

FIG. 8 is a block diagram of an electronic process control (EPC) system 8 in accordance with some embodiments of the present disclosure. The EM evaluation, analysis, and signoff methodologies (such as the EM evaluation method of FIG. 3) described herein are implementable, for example, using EPC system 8, in accordance with some embodiments.

In some embodiments, EPC system 8 may be a general purpose computing device including an I/O interface 80, a hardware processor 81, a network interface 82, a memory 84, and a bus 88.

The I/O interface 80 is coupled to external circuitry. In some embodiments, the EPC system 8 may be configured to receive information through the I/O interface 80. The information received through the I/O interface 80 may include one or more of instructions, data, design rules, process performance histories, target ranges, set points, and/or other parameters for processing by the hardware processor 81. The information may be transferred to the hardware processor 81 via the bus 88. The EPC system 8 may be configured to receive information related to a user interface (UI) through the I/O interface 80. The information may be stored in the memory 84 as user interface (UI) 87.

In one or more embodiments, the I/O interface 80 may include a keyboard, keypad, mouse, trackball, trackpad, touchscreen, and/or cursor direction keys for communicating information and commands to the hardware processor 81.

In some embodiments, the hardware processor 81 may be configured to execute instructions 85, which may be referred to as computer program code, encoded in the memory 84 in order to cause EPC system 8 to perform a portion or all of the EM evaluation, analysis, and signoff methodologies (such as the EM evaluation method of FIG. 3) described herein.

In some embodiments, the hardware processor 81 may be a central processing unit (CPU), a multiprocessor, a distributed processing system, an application specific integrated circuit (ASIC), and/or a suitable processing unit.

In some embodiments, the network interface 82 is coupled to the hardware processor 81 via the bus 88. The network interface 82 is connected to a network 83. Therefore, the network interface 82 may allow the EPC system 8 to communicate with network 83, to which one or more other computer systems are connected. Network interface 83 may include wireless network interfaces such as BLUETOOTH, WIFI, WIMAX, GPRS, or WCDMA; or wired network interfaces such as ETHERNET, USB, or IEEE-1364.

In one or more embodiments, the memory 84 may be referred to as a non-transitory, computer-readable storage medium. The memory 84 may be encoded with, i.e., stores, instructions 85 (or computer program code), such as a set of executable instructions. Execution of computer program code 85 by the hardware processor 81 implements a portion or all of the EM evaluation, analysis, and signoff methodologies (such as the EM evaluation method of FIG. 3) described herein.

In some embodiments, the memory 84 may be an electronic, magnetic, optical, electromagnetic, infrared, and/or a semiconductor system (or apparatus or device). For example, the memory 84 may include a semiconductor or solid-state memory, a magnetic tape, a removable computer diskette, a random access memory (RAM), a read-only memory (ROM), a rigid magnetic disk, and/or an optical disk. In one or more embodiments using optical disks, the memory 84 may include a compact disk-read only memory (CD-ROM), a compact disk-read/write (CD-R/W), and/or a digital video disc (DVD).

In some embodiments, the memory 84, amongst other things, may store formulas (such as the formulas Eqs. 1-2), design data corresponding to a simulated integrated circuit design layout, and models for calculating a simulated operating temperature (such as a pseudo-3-D thermal model or other suitable model). In some embodiments, the design data may utilize Open Artwork System Interchange Standard (OASIS) or another language for representing the integrated circuit design layout.

In some embodiments, the memory 84, amongst other things, may also store information which facilitates performing a portion or all of the EM evaluation, analysis, and signoff methodologies (such as the EM evaluation method of FIG. 3) described herein. In some embodiments, the memory 84 may store process control data 86 including, in some embodiments, control algorithms, process variables and constants, target ranges, set points, and code for enabling statistical process control (SPC) and/or model predictive control (MPC) based control of the various processes.

In some embodiments, a portion or all of the EM evaluation, analysis, and signoff methodologies (such as the EM evaluation method of FIG. 3) described herein may be implemented as a standalone software application for execution by a processor. In some embodiments, a portion or all of the EM evaluation, analysis, and signoff methodologies (such as the EM evaluation method of FIG. 3) described herein may be implemented as a software application that is a part of an additional software application. In some embodiments, a portion or all of the EM evaluation, analysis, and signoff methodologies (such as the EM evaluation method of FIG. 3) described herein may be implemented as a plugin for a software application. In some embodiments, at least one of the EM evaluation, analysis, and signoff methodologies (such as the EM evaluation method of FIG. 3) described herein may be implemented as a software application that is a portion of an EPC tool. In some embodiments, a portion or all of the EM evaluation, analysis, and signoff methodologies (such as the EM evaluation method of FIG. 3) described herein may be implemented as a software application that is used by the EPC system 8.

In some embodiments, the processes of the EM evaluation, analysis, and signoff methodologies (such as the EM evaluation method of FIG. 3) described herein are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 9:
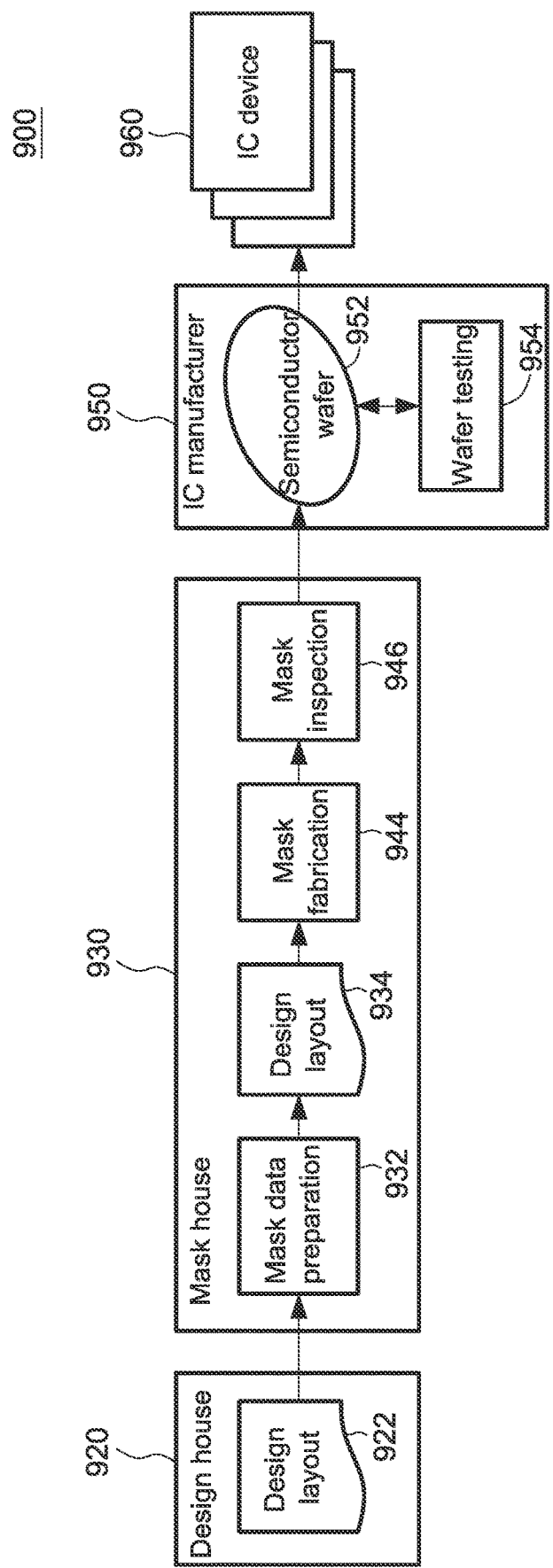
FIG. 9 is a schematic diagram showing an integrated circuit (IC) manufacturing system in accordance with some embodiments.

FIG. 9 is a schematic diagram showing an IC manufacturing system 900 in accordance with some embodiments. The IC manufacturing system 900 is configured to manufacture an IC device 960 through a plurality of entities, such as a design house 920, a mask house 930, and an IC manufacturer (fab or foundry) 950. The entities in the IC manufacturing system 900 are linked by a communication channel, e.g., a wired or wireless channel, and interact with one another through a network, e.g., an intranet or the Internet. In an embodiment, the design house 920, mask house 930 and IC manufacturer 950 belong to a single entity, or are operated by independent parties.

The design house (or design team) 920 generates a design layout 922, in an IC design phase for the IC devices 960 to be fabricated. The design layout 922 may be the simulated layout passing the EM analysis as described above. The design layout 922 includes descriptions of various geometrical patterns designed for performing specific functions that conform to the performance and manufacturing specifications. The geometrical patterns represent circuit features in the fabricated IC devices 960, e.g., metal layers, dielectric layers, or semiconductor layers, that form various IC components, such as an active region, a gate electrode, a source region or a drain region, and a conductive line or via of an interconnect structure (sometimes referred to as a redistribution layer). In an embodiment, the design house 920 operates a circuit design procedure to generate the design layout 922. The circuit design procedure may include, but is not limited to, logic design, physical design, pre-layout simulation, placement and routing, timing analysis, parameter extraction, design rule check and post-layout simulation. The design layout 922 may be converted from description texts into their visual equivalents to show a physical layout of the depicted patterns, such as the dimensions, shapes and locations thereof. In an embodiment, the design layout 922 can be expressed in a suitable file format such as GDSII, DFII, Oasis or the like.

The mask house 930 receives the design layout 922 from the design house 120 and manufactures one or more masks according to the design layout 922. In an embodiment, the mask house 930 includes a mask data preparation block 932, a mask fabrication block 944 and a mask inspection block 946. The mask data preparation block 932 modifies the design layout 922 so that a resulting design layout 934 can allow a mask writer to transfer the design layout 922 to a writer-readable format. Generally, the design layout 934 may include replicated cells thereon. When a mask is formed, it is repeatedly used to transfer the patterns of the cells to a semiconductor wafer, wherein the pattern transfer is done with an exposure field in each shot. In addition, scribe line regions or test structures may be formed in spaces between the exposure fields. In some embodiments, the mask data preparation block 932 is configured to determine the locations of dies that are to be included in a cell, the locations and widths of scribe line regions around the cells, and the locations and types of test structures to be formed in the scribe line regions.

The mask fabrication block 944 is configured to form a mask by preparing a substrate based on the design layout 934 provided by the mask data preparation block 932. A mask substrate is exposed to a radiation beam, such as an electron beam, based on the pattern of the design layout 934 in a writing operation, which may be followed by an etching operation to leave behind the patterns corresponding to the design layout. In an embodiment, the mask fabrication block 944 introduces a checking procedure to ensure that the layout data complies with requirements of a mask writer and/or a mask manufacturer and that the layout data can be used to generate the mask (photomask or reticle) as desired. An electron-beam (e-beam), multiple e-beams, an ion beam, a laser beam or other suitable writer source may be used to transfer the patterns. As a result, the patterns of the cells as acquired are transferred to a semiconductor substrate (such as a wafer) or material layers disposed on the semiconductor substrate. Moreover, the mask can be fabricated in various technologies. In an embodiment, the mask is fabricated using binary technology in which a binary mask includes a transparent substrate (e.g., fused quartz) and an opaque material (e.g., chromium) coated on the opaque regions of the mask. In another example, the mask is fabricated using a phase shift technology, e.g., a phase shift mask (PSM).

After the mask is fabricated, the mask inspection block 946 inspects the fabricated mask to determine if any defects, such as full-height and non-full-height defects, exist in the fabricated mask. If any defects are detected, the mask may be cleaned or the design layout in the mask may be modified.

The IC manufacturer 950 is an IC fabrication entity that includes multiple manufacturing facilities for the fabrication of a variety of different IC products. The IC manufacturer 950 uses the mask fabricated by the mask house 930 to fabricate a semiconductor wafer 952 having a plurality of IC devices 960 thereon. The semiconductor wafer 952 may include a silicon substrate or another suitable substrate including various layers formed thereon. In an embodiment, the IC manufacturer 950 includes a wafer testing block 954 configured to ensure that the IC conforms to physical manufacturing specifications and mechanical and/or electrical performance specifications. In some embodiments, the test structures formed on the wafer 952 may be utilized to generate test data indicative of the quality of the fabricated semiconductor wafer 952. After the wafer 952 passes the testing procedure performed by the wafer testing block 954, the wafer 952 may be diced (or sliced) along the scribe line regions to form separate IC devices 960. The dicing process can be accomplished by scribing and breaking, by mechanical sawing (e.g., with a dicing saw) or by laser cutting.

According to some embodiments, a method for testing a semiconductor device is provided. The method includes providing an active area in an integrated circuit design layout; grouping the active area into a first region and a second region; calculating a first self-heating temperature of the first region of the active area; calculating a second self-heating temperature of the second region of the active area; and determining an Electromigration (EM) evaluation based on the first self-heating temperature and the second self-heating temperature.

According to other embodiments, a method for testing a semiconductor device is provided. The method includes providing an active area in an integrated circuit design layout; grouping the active area into a plurality of regions, each of the regions including a polysilicon gate; calculating an operating temperature of the polysilicon gate in each of the regions; calculating a self-heating temperature of each of the regions based on the operating temperature of the polysilicon gate in each of the regions; and determining an EM evaluation based on the self-heating temperatures of the regions.

According to other embodiments, an apparatus is provided. The apparatus includes at least one non-transitory computer-readable medium having stored thereon computer-executable instructions and at least one processor coupled to the at least one non-transitory computer-readable medium. The computer-executable instructions cause the at least one processor to: grouping an active area of an integrated circuit design layout into a plurality of regions based on a predetermined criterion; calculating self-heating temperatures of the regions of the active area; and determining an EM evaluation based on the self-heating temperatures.

The methods and features of the present disclosure have been sufficiently described in the above examples and descriptions. It should be understood that any modifications or changes without departing from the spirit of the present disclosure are intended to be covered in the protection scope of the present disclosure.

Moreover, the scope of the present application in not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, may be utilized according to the present disclosure.

Accordingly, the appended claims are intended to include within their scope: processes, machines, manufacture, compositions of matter, means, methods or steps. In addition, each claim constitutes a separate embodiment, and the combination of various claims and embodiments are within the scope of the present disclosure.

What is claimed is:

1. A method, comprising:
providing an active area in an integrated circuit design layout;

grouping the active area into a first region and a second region;
calculating a first self-heating temperature of the first region of the active area;
calculating a second self-heating temperature of the second region of the active area;
determining an Electromigration (EM) evaluation based on the first self-heating temperature and the second self-heating temperature; and
generating a semiconductor device based on the integrated circuit design layout passing the EM evaluation,
wherein a height of the first region of the active area is different from a height of the second region of the active area.

2. The method of claim 1, wherein the first region and the second region of the active area include the same number of polysilicon gates disposed thereon.

3. The method of claim 2, further comprising grouping the active area into a third region, wherein the third region and the first region include different numbers of polysilicon gates disposed thereon.

4. The method of claim 3, wherein the third region is disposed at or adjacent to an edge of the active area.

5. The method of claim 1, further comprising grouping the active area into a third region, wherein the first region and the second region include the same width, and a width of the third region is different from the width of the first region or the second region.

6. The method of claim 5, wherein the third region is disposed at or adjacent to an edge of the active area.

7. The method of claim 1, wherein the first region includes a first heat generating structure and the second region includes a second heat generating structure.

8. The method of claim 1, wherein the first region includes a first heat generating structure and the second region excludes any heat generating structure.

9. The method of claim 1, further comprising:
identifying a heat sensitive structure in the integrated circuit design layout, wherein the heat sensitive structure is proximate to the active area;
calculating a third self-heating temperature of the heat sensitive structure; and
evaluating an evaluation temperature of the heat sensitive structure based on the first self-heating temperature, the second self-heating temperature, and the third self-heating temperature.

10. The method of claim 9, wherein determining the Electromigration (EM) evaluation comprises:
verifying that the heat sensitive structure passes the EM evaluation by comparing the evaluation temperature with a predetermined temperature.

11. The method of claim 9, wherein the heat sensitive structure comprises a conductive line.

12. A method, comprising:
providing an active area in an integrated circuit design layout;
grouping the active area into a first region and a second region, wherein a height of the first region of the active area is different from a height of the second region of the active area, wherein the first region includes a first plurality of the polysilicon gates and the second region includes a second plurality of the poly silicon gates;
calculating a first self-heating temperature of the first region of the active area based on an individual self-heating temperature of each of the first plurality of polysilicon gates;
calculating a second self-heating temperature of the second region of the active area based on an individual self-heating temperature of each of the second plurality of polysilicon gates;
determining an Electromigration (EM) evaluation based on the first self-heating temperature and the second self-heating temperature; and
generating a semiconductor device based on the integrated circuit design layout passing the EM evaluation.

13. The method of claim 12, wherein a number of the first plurality of polysilicon gates is identical to a number of the second plurality of polysilicon gates.

14. The method of claim 12, further comprising grouping the active area into a third region, wherein the first region and the second region include the same width, and a width of the third region is different from the width of the first region or the second region.

15. The method of claim 14, wherein the third region is disposed at or adjacent to an edge of the active area.

16. The method of claim 12, wherein the first region includes a first heat generating structure and the second region includes a second heat generating structure.

17. The method of claim 12, further comprising:
identifying a heat sensitive structure in the integrated circuit design layout, wherein the heat sensitive structure is proximate to the active area;
calculating a third self-heating temperature of the heat sensitive structure; and
evaluating an evaluation temperature of the heat sensitive structure based on the first self-heating temperature, the second self-heating temperature, and the third self-heating temperature.

18. The method of claim 17, wherein determining the Electromigration (EM) evaluation comprises:
verifying that the heat sensitive structure passes the EM evaluation by comparing the evaluation temperature with a predetermined temperature.

19. The method of claim 17, wherein the heat sensitive structure comprises a conductive line.

20. An apparatus, comprising:
at least one non-transitory computer-readable medium having stored thereon computer-executable instructions; and
at least one processor coupled to the at least one non-transitory computer-readable medium, wherein the computer-executable instructions cause the at least one processor to:
group an active area of an integrated circuit design layout into a first region and a second region, wherein a height of the first region of the active area is different from a height of the second region of the active area;
calculate a first self-heating temperature of the first region of the active area;
calculate a second self-heating temperature of the second region of the active area;
determine an Electromigration (EM) evaluation based on the first self-heating temperature and the second self-heating temperature; and
generate a tape out file for manufacturing a semiconductor device according to the integrated circuit design layout passing the EM evaluation.

* * * * *